(No Model.) 3 Sheets—Sheet 1.

W. M. FOWLER.
LIQUID MEASURING AND RECORDING APPARATUS.

No. 490,823. Patented Jan. 31, 1893.

Witnesses:
O. H. Hayford
J. B. Decker

Inventor:
William M. Fowler
by attorneys
Brown Seward (No Model.) 3 Sheets—Sheet 2.
W. M. FOWLER.
LIQUID MEASURING AND RECORDING APPARATUS.

No. 490,823. Patented Jan. 31, 1893.

Witnesses:—
D. H. Haywood
J. B. Decker

Inventor:—
William M. Fowler
by attorneys
Brown & Seward (No Model.) 3 Sheets—Sheet 3.

W. M. FOWLER.
LIQUID MEASURING AND RECORDING APPARATUS.

No. 490,823. Patented Jan. 31, 1893.

Witnesses:—
D. H. Hayford
J. B. ——

Inventor:—
William M. Fowler
by attorneys
Brown & Seward

UNITED STATES PATENT OFFICE.

WILLIAM MILES FOWLER, OF MILFORD, CONNECTICUT.

LIQUID MEASURING AND RECORDING APPARATUS.

SPECIFICATION forming part of Letters Patent No. 490,823, dated January 31, 1893.

Application filed April 11, 1892. Serial No. 428,629. (No model.)

*To all whom it may concern:*

Be it known that I, WILLIAM MILES FOWLER, of Milford, in the county of New Haven and State of Connecticut, have invented a new and useful Improvement in Liquid-Dispensing Apparatus, of which the following is a specification.

My invention relates to an improvement in liquid dispensing apparatus in which provision is made for regulating the quantity dispensed and its price and for making a permanent record of the price of the liquid dispensed at one time and registering the sum total of the prices of the liquid dispensed at several times.

Figure 1:
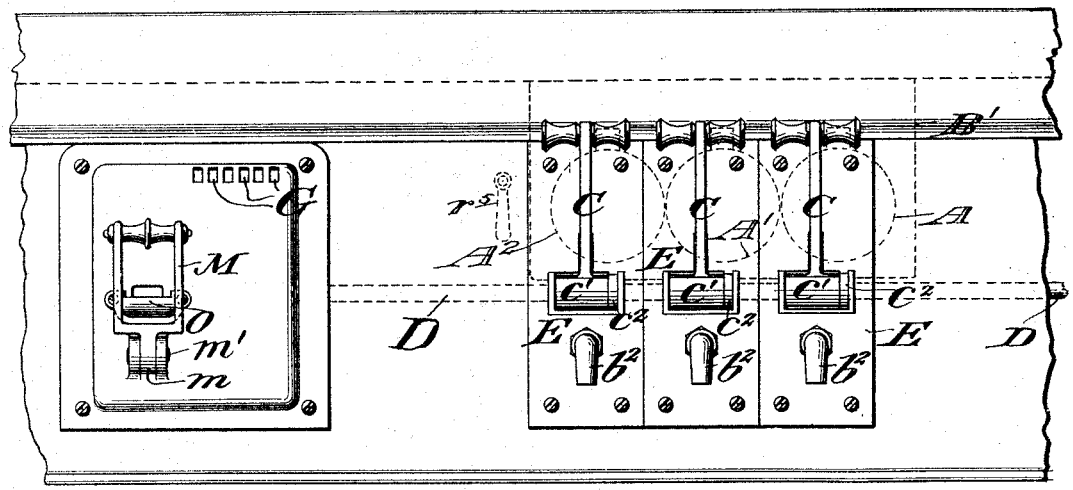
Figure 2:
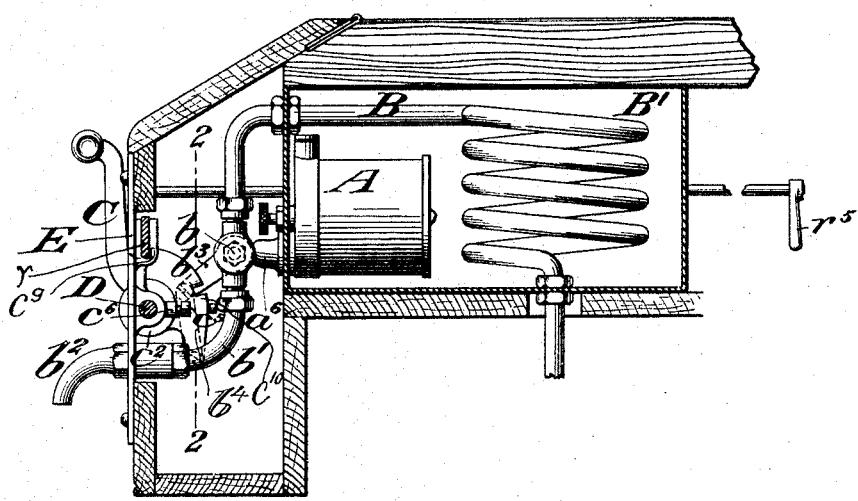
Figure 3:
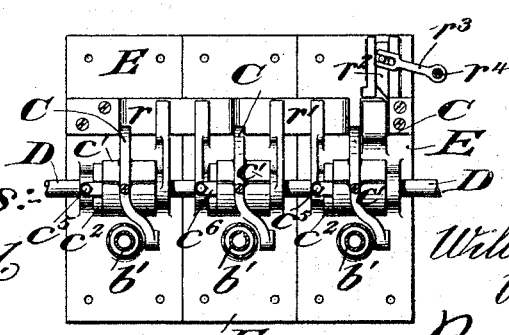
Figure 4:
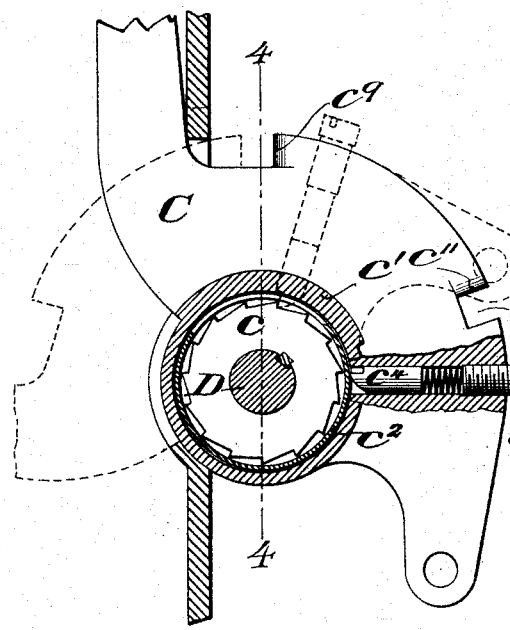
Figure 5:
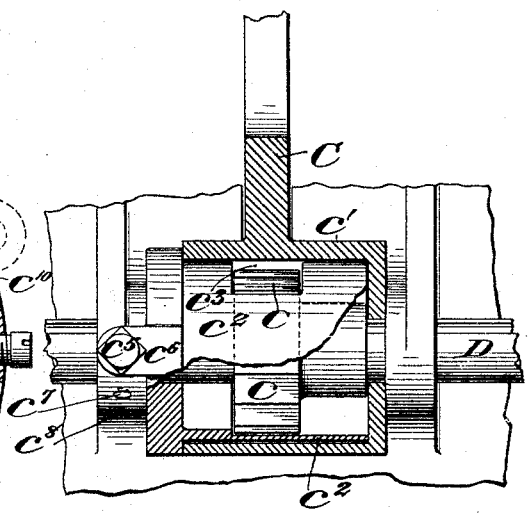
Figure 6:
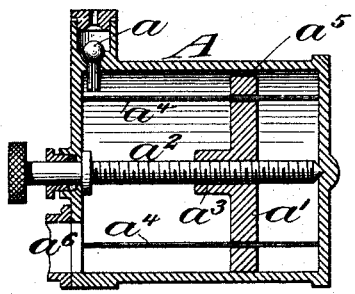
Figure 7:
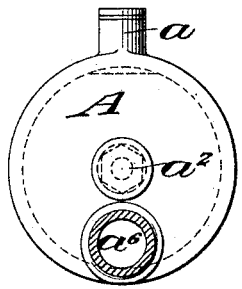
Figure 8:
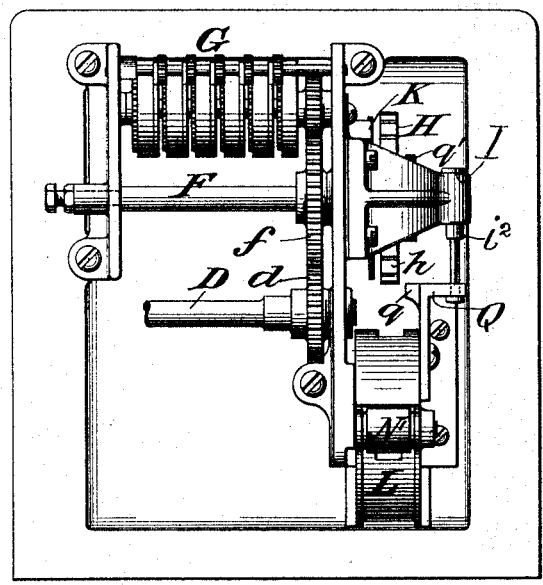
Figure 9:
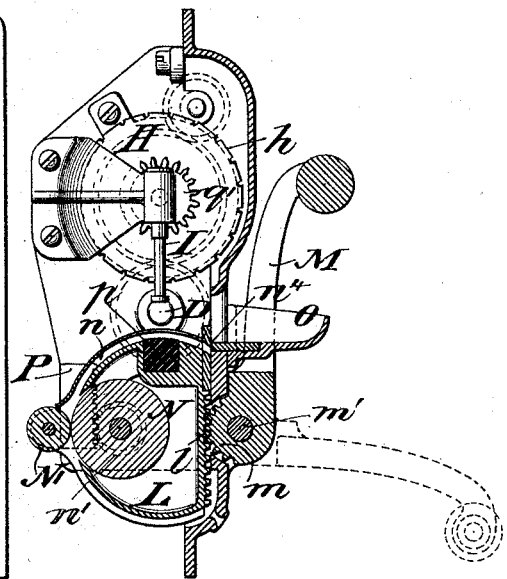
Figure 10:
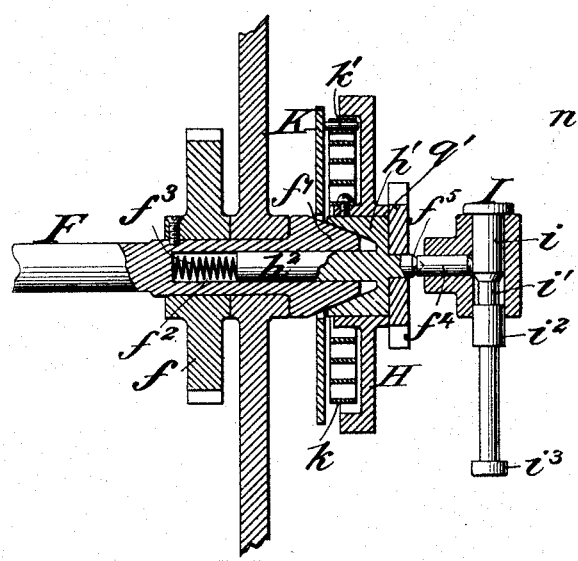
Figure 11:
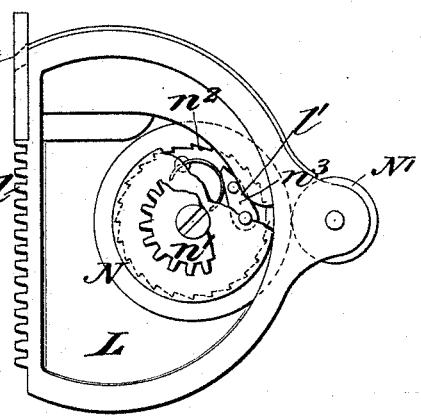

A practical embodiment of my invention is represented in the accompanying drawings in which Figure 1 is a front view of the dispensing recording and registering apparatus, as it appears set up for use, Fig. 2 is a view in side elevation of one of the dispensing apparatuses, the casing being represented in section, Fig. 3 is a rear view of the operating levers and the shaft for determining the amount to be recorded and registered, the section being taken through line 2, 2 of Fig. 2, Fig. 4 is an enlarged section from front to rear showing the connection between the operating lever and the shaft for controlling the recording and registering mechanism, Fig. 5 is a vertical section taken through line 4, 4 of Fig. 4, Fig. 6 is a longitudinal section through one of the measuring receptacles, Fig. 7 is a front view of one of the measuring receptacles, Fig. 8 is a view of the recording and registering mechanism in rear elevation, Fig. 9 is a view of the same in side elevation, partly in section, Fig. 10 is an enlarged longitudinal section showing the connection between the printing wheel and its shaft and the operative parts in immediate connection therewith and Fig. 11 is an enlarged view in side elevation of the impression mechanism.

My invention contemplates one or more dispensing apparatuses each comprising a measuring receptacle in connection with a supply reservoir and supplied with means for varying its measuring capacity, a recording device under the control of each of the dispensing apparatuses singly and collectively to make a record corresponding to the amount dispensed from one or more of the dispensing apparatuses at one transaction and a registering device also under the control of the dispensing apparatuses singly and collectively to register the sum total of a series of transactions.

One or more measuring receptacles A, A', $A^2$, in the present instance three, are arranged in a line and may be conveniently located within a cooling chamber B' through which a supply pipe B extends to supply the receptacle with liquid. Each of the receptacles is provided with a valve $a$ adapted to close an opening in the upper portion of the receptacle and prevent overflow when the receptacle is filled and to admit air around it into the receptacle while the liquid is being drawn therefrom. A sliding piston $a'$ is arranged within the receptacle and adapted to be moved along within the receptacle toward and away from the outlet in order to lessen or increase the amount of liquid which may be drawn therefrom at one time. In the present instance I have shown a screw threaded spindle $a^2$ extending from without the receptacle into it and engaging with a screw threaded hub $a^3$ of the piston $a'$ so that when the spindle is turned in one direction or the other, the piston will be caused to move in one direction or the other within the receptacle. To prevent the piston from turning within the receptacle, I have provided guide rods $a^4$ therein. The piston is cut away at its top, as shown at $a^5$, for the purpose of permitting the liquid within the receptacle to pass back and forth from one side to the other, as its position is changed, to vary the capacity of the measure.

In practice it will be observed, that while the receptacle may be filled with liquid upon both sides of the piston, only that which is on the side on which the outlet is located will be permitted to run out of the receptacle when the outlet is opened.

The supply pipe B connects with a common inlet and outlet opening $a^6$, through a three-way cock $b$ of any well known or approved construction, in which the ports are so arranged that when turned in one direction, communication will be established between the supply pipe B and the interior of the measuring receptacle; and when turned in the opposite direction, such communication will be cut off and an opening will be established between the receptacle and the outlet pipe $b'$ leading to the spout $b^2$.

An operating lever C is loosely mounted upon a shaft D, its operating handle projecting in front of a casing E and its opposite arm being located within said casing and connected with the handle $b^3$ of the cock $b$ by a link $b^4$. The shaft D on which the operating lever C is mounted is employed to transmit motion to the recording and registering devices, and the connection between the operating lever C and the shaft D is such that it may, during its complete stroke, cause the shaft D to rotate more or less in accordance with the pre-determined amount or price of the liquid to be dispensed at one time from any one of the measuring receptacles. In the present instance I have so arranged the connection that the shaft D may be turned three different distances for a single downward stroke of the operating lever C and thereby register three different prices for a certain quantity of liquid to be dispensed, as may be determined upon. For the purpose of the present explanation, I shall consider that when turned the lesser of the three distances, the shaft will move the recorder and register to record and register five cents, when moved the medium distance, ten cents, and when moved the whole, or greatest, distance fifteen cents. The connection by which this is accomplished is as follows: A ratchet toothed wheel $c$ is keyed on the shaft D and the operating lever is provided with a hollow hub $c'$ which embraces said ratchet wheel and also embraces a barrel $c^2$ which surrounds a portion of the ratchet toothed wheel $c$ within the hub of the lever. The barrel $c^2$ is provided with an opening $c^3$ through which a spring actuated plunger or dog $c^4$ seated in the operating lever C may gain access to and engage with a tooth of the ratchet wheel $c$. The barrel $c^2$ may be rotated within the hub $c'$ of the operating lever and independently of the shaft D so as to expose more or less of the opening $c^3$ to the path of the dog $c^4$, as may be desired. Thus, if the barrel be so adjusted that the dog $c^4$ does not reach the opening $c^3$ until the lever C has nearly completed its stroke, the dog will only engage and move the wheel $c$ and hence the shaft D the distance of one tooth. If however, the barrel be set so that the dog $c^4$ may engage the wheel $c$ at one-third of the lever's stroke, it will move the wheel $c$ and hence the shaft C the distance of two teeth. And again, if the barrel be so moved that the dog $c^4$ be allowed to engage the wheel $c$ at the beginning of its stroke, it will move the latter and hence the shaft D the distance of three teeth.

The adjustment of the barrel may be conveniently made by means of a set screw $c^5$ extending through a lug $c^6$ on the barrel and into perforations $c^7, c^8$ on the supporting frame.

The shaft D, at a suitable distance from the dispensing mechanism, is provided with a spur wheel $d$ in gear with a spur wheel $f$ on the shaft F journaled in suitable bearings in the frame of the registering and recording mechanism. Adding mechanism G, of any well known or approved construction, is arranged to be operated by the spur wheel $f$ to register the sum total of the units of price corresponding to the liquid dispensed.

In using the term "units of price" I refer to that price which is assumed as the price of the least quantity or cheapest quantity of liquid which is to be dispensed at one time and in my present apparatus the prices of quantities greater than the least or more valuable than the cheapest are assumed as multiples of this lower price. For example, in practice if the lowest price at which any quantity of liquid dispensed at one time be five cents, the prices of a greater quantity or more valuable portion of liquid will be ten cents, fifteen cents or some other multiple of five cents. As the adding mechanism is arranged to register one unit for every five cents, the sum total of the units registered by said adding mechanism will represent the number of five cents for which the liquid dispensed has been sold. The relation between the adding mechanism and the teeth on the ratchet wheel $c$ in connection with the dispensing mechanism is such that the movement of the ratchet wheel $c$ one tooth will operate the adding mechanism sufficiently to register one unit, and the mechanism of said ratchet wheel two or three teeth will operate the adding mechanism to register two or three units to correspond therewith.

In connection with the shaft F, there is a type wheel H provided on its face with type $h$ representing five cents, ten cents, &c., increasing at regular intervals of five units up to one hundred, more or less, as may be found desirable. The wheel H is fixed to a clutch section $h'$, which latter is adapted to engage the tapered end $f'$ of the shaft F for the purpose of causing the said wheel to turn together with the shaft. The clutch section $h'$ is also provided with a central pin or plunger $h^2$, adapted to enter a socket $f^2$ in the end of the shaft F, and a spring $f^3$ inserted in the socket $f^2$ between the end of the socket and the end of the pin or plunger $h^2$ has a normal tendency to push the clutch section $h'$ out of engagement with the taper end $f'$ of the shaft F. The wheel H is however held normally in close engagement with the shaft by means of a sliding key I, the enlarged portion $i$ of which forces a bearing piece $f^4$ against a conical journal $f^5$ on the clutch piece $h'$. When, however, the key I is slid upwardly so as to bring its reduced portion $i'$ opposite the end of the bearing piece $f^4$, the latter will be permitted to yield under the tension of the spring $f^3$ and the clutch section $h'$ will thereby be thrown out of engagement with the shaft F.

The type wheel H is connected with a stationary disk K, fixed to the supporting frame by means of a coil spring $k$ one end of which is connected to a pin $k'$ on the disk and on the other end to the hub of the wheel H. The disk K in addition to its function of a support for one end of the spring $k$, also serves to hold the spring in position relative to the type wheel H and forms a housing for one end of said spring. When the type wheel H is turned by its engagement with the shaft F, it is against the tension of the spring $k$ and such movement tends to wind the spring, so that the moment the clutch section $h'$ is released from the shaft F, the spring $k$ will return the type wheel H to its normal position.

The relation between the type wheel H and the teeth upon the ratchet wheel $c$ in connection with the dispensing mechanism, is such that the movement of the ratchet wheel one tooth will, through the shafts D and F and their connections, rotate the type wheel H the distance between two types or—in the present instance—an interval of five cents. From this it follows; that the successive movements of any one or several of the operating levers of the dispensing mechanisms will serve to advance the type wheel H as many intervals of five cents as the wheel or wheels $c$ have been advanced teeth. For instance, if one of the operating levers of one of the dispensing mechanisms be operated to advance its wheel $c$ one tooth, another two teeth, and another three teeth; the sum total of the advances of the wheel $c$ will be the distance of six teeth and the type wheel H will have been thereby advanced six intervals of five cents and its type representing thirty cents will have been thereby brought into position to print.

The mechanism for securing the impression is as follows: a sliding frame L is mounted in the supporting frame so as to slide back and forth toward and away from the type on the wheel H. The sliding frame L is provided with a rack $l$ adapted to engage a toothed sector $m$ on an operating lever M pivoted to the frame as at $m'$. When the lever M is depressed the engagement of the sector $m$ with the rack $l$ serves to lift the frame L toward the type and when the lever is reversed, the movement of the frame L is away from the type. The frame L carries a supply roller N on which may be wound a coil of tape for receiving the impression from the type and the free end of said coil of tape may be led from the roll through an inner channel $n$ leading toward the front of the casing and adapted, when the frame L is elevated, to open at its front into a receiving cup O fixed to the front of the casing. A loose roller N' serves to guide the tape into the channel $n$. The roller N has loosely mounted on its shaft a spur wheel $n'$ which spur wheel is in engagement with a rack P fixed to the casing so that, as the frame L is raised and lowered, the spur wheel $n'$ will be caused to turn. The spur wheel $n'$ is connected with the roller N by means of an annular series of ratchet teeth $n^2$ carried by the roller N and a spring actuated pawl $n^3$ carried by the spur wheel. The arrangement of teeth $n^2$ and the pawl $n^3$ is such that when the frame L is moved toward the type, the pawl $n^3$ will slide freely over the ratchet teeth and will not move the roller N to feed the strip. But, when the said frame L is moved away from the type, the pawl $n^3$ will engage the tooth $n^2$ and thereby lock the spur wheel $n'$ to the roller N and cause it to rotate and feed the strip. An impression pad $p$ is carried in the upper portion of the frame L for pressing the strip yieldingly into contact with the type and a cutting edge $n^4$ at the mouth of the channel $n$ is arranged to co-operate with the straight edge at the rear of the receiving cup O so that just before the frame L reaches the limit of its downward stroke, it will sever the printed portion of the strip from the body of the strip and leave it detached within the cup O.

To prevent the forward feed of the strip within the channel $n$ after the cutter has begun its work, I provide a cam $l'$ on the frame L the function of which is to engage and lift the pawl $n^3$ out of engagement with the ratchet tooth $n^2$ just before the frame L completes the limit of its downward stroke and thereby stop the further feed of the strip at that point. From this it follows that; when the operating lever M is depressed, the frame L will be moved toward the type and an impression will be formed on the strip near its end. As soon as the lever M begins its return movement, the printed strip will be fed forward into the receiving cup O and just before the frame L reaches the limit of its downward stroke the printed strip will be cut off and left free to be removed from the cup O.

The sliding frame L has fixed thereto an arm Q, the end of which partially embraces the spindle of the key I and just before the sliding frame reaches the limit of its upward movement, the arm Q reaches a shoulder $i^2$ on the key and lifts it so as to bring the reduced part $i'$ opposite the bearing piece $f^4$ to release the type wheel from the shaft F. At this same moment however a nose $q$ on the arm Q enters between two of the teeth on the toothed wheel $q'$ fixed to rotate with the type wheel H and thereby prevents the latter from returning to its normal position under the tension of the spring $k$ until after the impression has been made and the sliding frame L begins its downward movement. I also find it desirable to bevel the sides of the teeth on the wheel $q'$, so that the nose $q$ will serve—as it passes between two teeth—to center the type wheel so as to bring the type squarely into position to make a clear impression. Just before the sliding frame reaches the limit of its downward movement, the arm Q will engage a shoulder $i^3$ on the key I and slide it downwardly into position to bring its enlarged portion $i$ opposite the bearing piece $f^4$ and thereby crowd the type wheel into frictional engagement with the shaft F, ready for further operation.

In order to prevent a simultaneous operation of two or more of the operating levers C, I provide a series of locking bars $r, r'$ placed end to end and given sufficient play to admit one of the levers C only to pass between them at one time. The adjacent ends of the bars $r, r'$ are preferably beveled and the portion $c^9$ of the lever C which is adapted to pass between them is also provided with a rounded or beveled face so that when one of the levers C is pulled forward it will push the bars out of the way to allow it to pass between them and in so, doing will prevent any other lever C from being operated while the lever first moved is between the limits of its stroke. For the purpose however of providing for the rapid successive movements of several levers without the delay of returning them to their normal position, I provide an additional slot or opening $c^{10}$ with a beveled edge $c^{11}$ so that when any one of the levers has reached the downward limit of its stroke to draw the liquid, another lever may be immediately brought from its normal down to its depressed adjustment, the locking blocks being allowed to slide through the notch $c^{10}$ in the lever first depressed. After the second lever is down to draw liquid, a third may be depressed in the same manner and so on, each succeeding lever which is depressed serving to slide the locking blocks through or into the opening in the lever previously depressed. The levers when so consecutively depressed, will operate the registering apparatus at each depression and will also operate the recording mechanism to print the cumulative amount. The levers may be returned to their normal positions consecutively, either in the order in which they were depressed, or in any other convenient order.

It is obvious that the series of locking blocks might be arranged to enter sockets in the opposite sides of the several levers instead of passing through openings formed therein.

In order to lock all levers against operation, I provide a sliding piece $r^2$ which may be thrown into and out of position with the end of one of the sliding blocks to crowd them close together. The sliding piece $r^2$ may be operated by an arm $r^3$ on a rock shaft $r^4$ which may be operated by a handle $r^5$ and the latter—if so desired—may be secured by a lock of any well known or approved construction, the key of which may be held by the proprietor or any person designated by him.

Having given the operation of the several parts in detail, the operation of the apparatus as a whole may be briefly described as follows:—Liquids of varying qualities and prices or several portions of liquids of the same price may be dispensed by operating one or more of the levers of the dispensing mechanism and such operation of the dispensing levers will have registered the sum total of price units upon the registering device and will, at the same time, have turned the type wheel into position to bring the type which represents the price of all the portion dispensed at that transaction into position to print. All that remains to be done is, to operate the recording lever and thereby print and deliver a ticket containing such price. It is assumed, of course, that a number of portions of liquid dispensed at one transaction, will not carry the type wheel beyond a single revolution which, in the present form of my invention, is the limit of its advance movement. In case it should be required to record a price higher than the wheel is made to record for a single transaction, it may be readily accomplished by making two or more records instead of one.

What I claim is:—

1. In combination, one or more dispensing mechanisms, a recording device and a registering device, the recording device being under the control of the dispensing mechanism to determine the price to be recorded for a single transaction and the registering device being simultaneously under the control of the dispensing mechanism to determine the sum total of a plurality of transactions, substantially as set forth.

2. In combination, one or more dispensing mechanisms, a recording device, a registering device, and a common connection between the dispensing mechanisms and the recording and registering devices, whereby the operation of the dispensing mechanisms, serves to determine the price to be recorded for that operation and registers the price either alone or in connection with other operations, substantially as set forth.

3. In combination, a dispensing mechanism, a recording mechanism, a shaft connecting the two and a variable connection between the said shaft and the dispensing mechanism whereby the shaft may be rotated more or less while the quantity of liquid dispensed remains constant, substantially as set forth.

4. In combination, a dispensing mechanism, a recording mechanism a shaft connecting the two, an operating lever for the recording mechanism and an impression device, the recording mechanism being under the control of the dispensing mechanism to determine the amount to be recorded and the impression device being under the control of said operating lever to make the record, substantially as set forth.

5. The dispensing mechanism comprising the measuring receptacle, means for supplying liquid thereto, means for withdrawing the liquid therefrom and a sliding piston within the measuring receptacle, the interior portions of the receptacle upon both sides of the piston being in permanent communication with each other, substantially as set forth.

6. The combination with the shaft and the dispensing operating mechanism for controlling the movements of the shaft, of a printing wheel having an interrupted connection with the shaft and means for controlling the connection of the printing wheel with the shaft, substantially as set forth.

7. The combination with the shaft and means for rotating it, of a spring actuated printing wheel having an interrupted engagement with the shaft, an impression device, means for moving the impression device toward and away from the printing wheel and a key under the control of the impression device and its operating means to throw the printing wheel into engagement with the shaft, substantially as set forth.

8. The combination with a dispensing device the shaft and means for rotating the shaft, of a printing wheel having an interrupted engagement with the shaft, an impression device, means for moving the impression device toward and away from the printing wheel, a tape supply roller carried by the frame of the impression device, tape feed mechanism and means for interrupting the feed during a portion of the movement of the impression device, substantially as set forth.

9. The combination with a dispensing device the printing wheel and means for operating it, of the impression device supported in a reciprocating frame, a tape supply roller, a tape conduit on the frame, tape feed mechanism, a cutter carried by the frame a stop carried by the frame to temporarily lock the printing wheel and means for operating the frame and thereby securing an impression, feeding the tape and severing the printed portion, substantially as set forth.

10. In combination, several dispensing mechanisms each provided with its own operating lever, locking mechanism in position to prevent the simultaneous movement of two operating levers, the connection between the locking device and the levers being such that a second lever may be operated as soon as the preceding lever has completed its advance stroke, substantially as set forth.

WILLIAM MILES FOWLER.

Witnesses:
FREDK. HAYNES,
CHARLES E. SUNDGREN.